Figure 1:
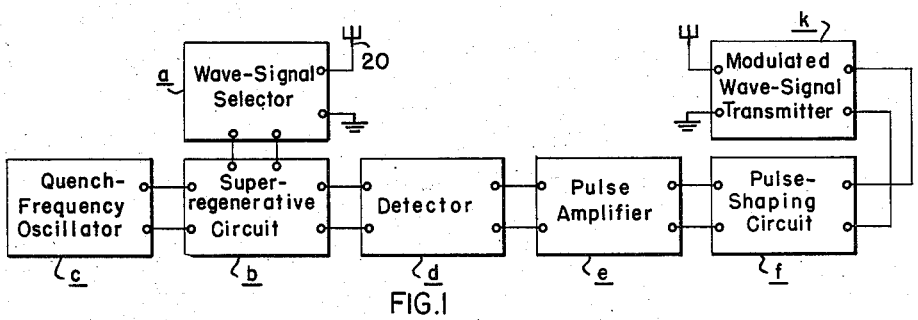

Feb. 13, 1951     M. K. TAYLOR ET AL     2,541,558

CONTROL ARRANGEMENT FOR THERMIONIC VALVE SYSTEMS

Filed Aug. 5, 1947

*INVENTORS*
MAURICE K. TAYLOR
FREDERIC C. WILLIAMS
RONALD H. A. CARTER

BY John A. Harvey

ATTORNEY

Patented Feb. 13, 1951

2,541,558

UNITED STATES PATENT OFFICE 2,541,558

CONTROL ARRANGEMENT FOR THERMIONIC VALVE SYSTEMS

Maurice K. Taylor, Hollinwood, and Frederic C. Williams and Ronald H. A. Carter, Millbank, London, England, assignors to Ferranti Limited, Hollinwood, England, a corporation of Great Britain Application August 5, 1947, Serial No. 766,392
In Great Britain May 22, 1945

Section 1, Public Law 690, August 8, 1946
Patent expires May 22, 1965

8 Claims. (Cl. 177—353)

This invention relates to a control arrangement for a plurality of thermionic valve systems and is more particularly concerned with an arrangement by means of which it is possible to provide either for the cyclic operation of each of such systems singly in predetermined order or for the substantially uninterrupted operation of only a specific one of them.

The expression "substantially uninterrupted operation" used above and hereinafter is intended to mean that the specific system operates continuously except for a short interruption at the end of each operating cycle of the control arrangement.

The thermionic valve systems so controlled may be of any desired type but the invention is especially useful in connection with thermionic valve radio receiving and/or transmitting systems, each comprising variable tuning means arranged to be swept through a different band of frequencies during its period of operation. For example, the control arrangement may be associated with a plurality of wave-signal translating systems each arranged to constitute a "responder," including a receiver and a transmitter operated in response to the signal output of the receiver, for the purpose of providing identification of a remote object, such as an aircraft, within the exploration field of a radio-locating system employing a pulsed exploring wave.

It is an object of the present invention to provide a new and improved control arrangement for determining a desired operating relation as between a plurality of thermionic valve systems.

It is another object of the invention to provide a new and improved control arrangement for selectively permitting a plurality of thermionic valve systems to operate singly in predetermined cyclic order or for permitting substantially uninterrupted operation of only one such system.

A specific object of the invention is to provide a new and improved control arrangement especially suited for establishing a predetermined sequential operation of a plurality of responder systems or for selectively permitting substantially continuous operation of a particular one of the responders.

According to one aspect of the invention, a control arrangement for a plurality of thermionic valve systems having control circuits so arranged as to control these systems to operate singly in a predetermined cyclic order or to control a specific one of these systems to operate in a substantially uninterrupted manner. This arrangement comprises a change-over switching means including switch elements coupled to the control circuits and so arranged as to effect in one switching condition such intercoupling of the control circuits that thermionic valve systems operate singly in the predetermined cyclic order and as to effect in another switching condition such intercoupling of the control circuits that a specific one of the thermionic valve systems operates in a substantially uninterrupted manner. The arrangement includes automatic switching means for conditioning the switching means at regular intervals for actuation from its one to its other switching condition. Additionally, there are provided means, actuated by the occurrence during one of the aforementioned regular intervals of a characteristic of a signal of the specific system which is present only when the substantially uninterrupted operation of that system is desired, for effecting the change of the change-over switching means from its one to its other switching condition. There are also included in the arrangement means having an energizing circuit which is completed upon the change of the change-over switching means for retaining the switching means in the other switching condition and means for momentarily interrupting the energizing circuit after a preselected time interval.

According to another aspect of the invention, a control arrangement for permitting each of a plurality of thermionic valve systems to operate singly in predetermined cyclic order or for permitting the substantially uninterrupted operation of only a specific one of the systems comprises cyclically operating means for assigning predetermined operating periods to each of the systems in turn in predetermined cyclic order. The arrangement has a change-over switching means having one operating condition which permits the systems to operate singly in the predetermined cyclic order and having a second operating condition which permits the substantially uninterrupted operation of only the specific system. The arrangement includes means, actuated by the occurrence during the assigned operating period of the specific system of a characteristic of that system which is present only when substantially uninterrupted operation of the system is desired, for actuating the change-over switching means from its one to its other operating condition. The arrangement has further means for returning the change-over switching means to its first operating condition at a time immediately preceding a subsequent assigned operating period of the specific system.

In order that the invention may be more readily understood it will now be described, by way of example and with reference to the accompanying drawing, with relation to its application to the control of two thermionic valve responder systems in an aircraft for providing identification of the latter in conjunction with the pulsed exploring waves of two different types of radio-location apparatus. It is to be understood however that the invention is by no means limited to such an application or to the control of two thermionic valve systems only.

Figure 2:
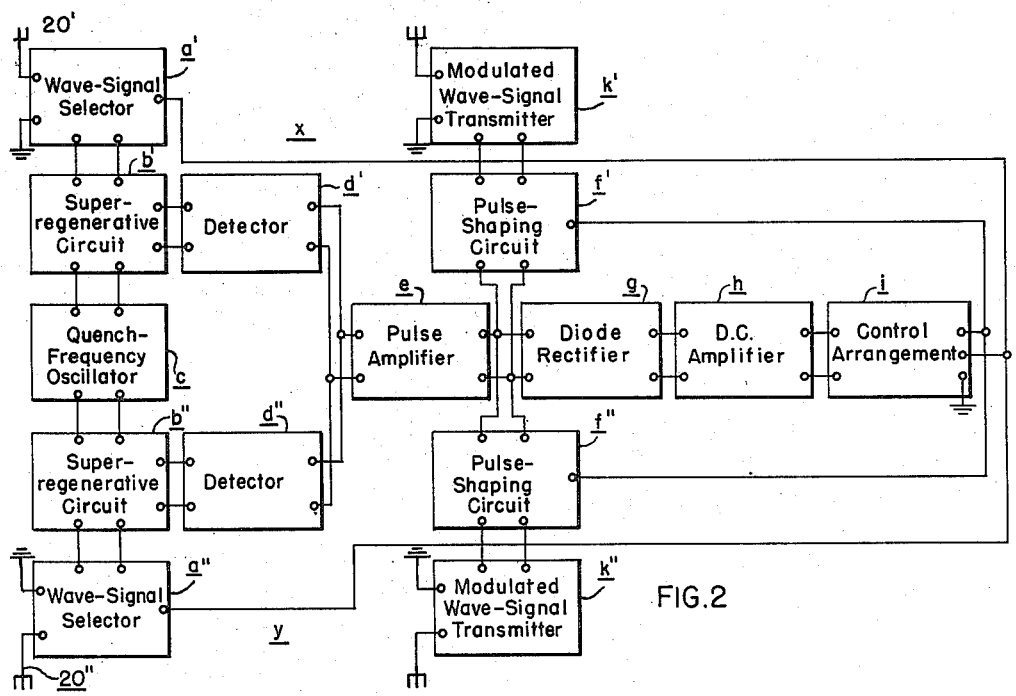
Figure 3:
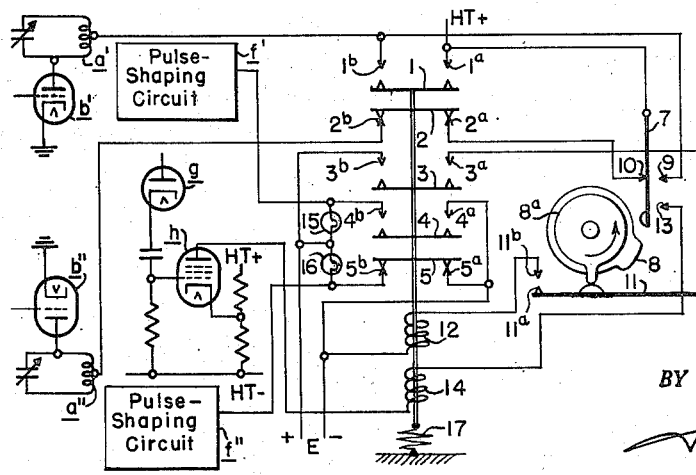

In the accompanying drawing, Fig. 1 is a schematic representation of one form of responder means for receiving and retransmitting signal pulses transmitted from one e. g. ground, radio-location station; Fig. 2 represents schematically two responder means, embodying a control arrangement in accordance with the invention for receiving and retransmitting signal pulses transmitted from each of the types of ground radio-location station; and Fig. 3 is a schematic diagram of a control arrangement in accordance with an embodiment of the invention.

In the usual method of effecting the radio-location of aircraft, a pulsed exploring wave comprising a series of signal pulses, each pulse being formed by a short burst of radio frequency energy, is transmitted from one or more ground stations. Such pulses, if incident upon an aircraft, are reflected therefrom and part of this reflected energy may be received by the ground station and applied to apparatus for giving an indication of the presence of the aircraft.

Such a reflected signal, however, does not give an indication of the nature of the aircraft. Thus in wartime it is impossible to state from such received signals whether the aircraft is of friendly or enemy origin.

In order to provide an indication of the nature of the aircraft, all aircraft of friendly origin may be fitted with a signal receiving and retransmitting means usually known as a responder. Such a responder may comprise the apparatus shown in the block diagram of Fig. 1 of the accompanying drawing. The signal pulses transmitted from the ground station are received by an aerial 20 and applied to a wave-signal selector or tuned circuit $a$, the tuning condenser of which sweeps through a band of frequencies including the carrier frequency of the pulsed exploring wave. When the circuit $a$ is tuned to the carrier frequency of one particular ground station, each received pulse is amplified by a superregenerative receiving circuit $b$, supplied with a quenching oscillation from an oscillator $c$. The output from stage $b$ is applied to a detector circuit $d$ and the rectified output therefrom is applied to a pulse-amplifier stage $e$. The amplified output is fed to a pulse-widening or shaping circuit $f$, which includes a capacitance whose value may be varied automatically by suitable driving mechanism, and thence to the control grid of a transmitting valve included in a modulated wave-signal transmitter $k$. The transmitting valve may be the same valve as that in the superregenerative stage $b$, or it may be a separate valve having the same tuned circuit $a$ connected between its anode and control grid; that is to say, the tuned circuit $a$ may be common to both the receiving valve and the transmitting valve. However, for the sake of simplicity, the drawing indicates a transmitter which is complete in itself. The arrangement of Fig. 1 does not embrace the present invention and all of its several components may have a construction and operation well understood by those skilled in the art, rendering a further detailed description thereof unnecessary.

By the provision of such apparatus a signal pulse received from a ground station is translated in the usual way by superregenerator $b$, detected in detector $d$, amplified and shaped in units $e$ and $f$, respectively, and applied as a modulating signal to transmitter $k$. Thus, a received pulse is retransmitted in amplified form and with considerably increased width, the increase in width being determined by the pulse-widening circuit $f$. This amplified and widened retransmitted pulse appears as such when rendered visible on the screen of a cathode-ray oscillograph incorporated in the apparatus at the ground receiving station. Therefore, it is possible to distinguish between an aircraft fitted with the above-described responder means and an aircraft which is not so fitted by observing either the width or the height or both of the reply pulse signal received at the ground station.

Two classes of ground-station radio location are in general use, the carrier frequency of the pulses from each class being in a different frequency band. One class, which comprises early warning stations, is employed for the purpose of giving a long-range indication of the approach of an aircraft. The other class is for short-range detection and, when provided in association with anti-aircraft batteries, is employed as a gun-laying station for the purpose of indicating the bearing and range of an aircraft. Since it is only necessary to know the bearing and range of an enemy aircraft just before the moment of firing, the effective area of this latter class of ground stations need only be small. Because the carrier frequencies of the signals from the two classes of ground station may be widely separated and, on account of their high value, it would appear necessary to provide an aircraft with two complete and independent sets of responder apparatus in order that appropriate identification signals may be returned to both classes of ground stations by a friendly aircraft. Where that is done, the frequency band of one responder includes only the carrier frequencies of the pulses transmitted from the early-warning stations and the frequency band of the other responder includes only the carrier frequencies of the pulses transmitted from the gun-laying stations. Such an arrangement has, however, several disadvantages. The apparatus is, of necessity, unduly large because only the supply unit is usually common to both responder circuits. Since the power supply has to be larger than that of a single responder, the supply unit itself is both heavier and more costly. A further technical difficulty arises because of mutual interference between the two aerial systems associated with the two responder circuits.

Since the aircraft is likely to be in an early-warning area for the greater part of its time, it is sufficient in many installations if the responder apparatus of such aircraft is rendered responsive to early-warning stations for most of the time and if automatic switching means are provided to permit response to gun-laying stations for, say, two seconds in every six seconds, thus enabling the aircraft's presence to be made known should it enter a gun-laying area. It is essential, however, in order to avoid serious mistakes, that if the apparatus happens to be responsive to gun-laying stations upon entering a gun-laying area it is not then switched over so as to respond to signals from early-warning stations; or if it happens to be responsive to early-warning stations it will not, after the subsequent switching to respond to gun-laying stations, switch back again to respond to early-warning stations until the aircraft leaves the gun-laying area. That is to say, while the aircraft is within a gun-laying area, it should respond only to signals from gun-laying stations. This desired mode of operation with its inherent saving in the expense, size and weight of apparatus is realizable with the control arrangement of this invention, permitting each of the plurality of responder systems to operate singly in predetermined cyclic order or selectively permitting the substantially uninterrupted operation of only a specific one of such systems.

In carrying the invention into effect according to one form, shown by way of example in Figs. 2 and 3 of the accompanying drawing, two responder means of the type represented in Fig. 1 are embodied in an aircraft and associated with a new and improved control arrangement. The responders have certain of their components common to one another. Referring more particularly to Fig. 2, one responder means $x$ is adapted to respond only to signal pulses transmitted from short range or gun-laying stations. The other responder means $y$ is adapted to respond only to signal pulses transmitted from early-warning stations. Each circuit is similar to that of Fig. 1, the components peculiar to means $x$ and $y$ bearing the same reference letters as the corresponding components in Fig. 1 with either a prime or double-prime notation respectively. The quench-frequency oscillator $c$ and the pulse amplifier $e$ are common to both responders.

The output from the amplifier stage $e$, besides being taken to the pulse-widening or shaping circuits $f'$ and $f''$, each of which includes a capacitance whose value may be varied automatically by a suitable driving mechanism, is arranged to be fed also to a diode rectifier $g$ and then to a D. C. amplifier $h$. The amplified output from amplifier $h$ is adapted to energize a control arrangement or switching system $i$ arranged, in accordance with the invention, to cause operation of either superregenerative stage $b'$ or superregenerative stage $b''$, and of either the driving mechanism included in pulse-widening circuit $f'$ or the driving mechanism included in pulse-widening circuit $f''$.

The switching system $i$, see more particularly Fig. 3, comprises a change-over switching means, having one operating condition which permits the responders to operate singly in a predetermined cyclic order and having another operating condition which permits the substantially uninterrupted operation of only a specific responder, namely, that designated $x$. While this switching means may be provided by tube elements having off and on operating conditions, simplicity may be obtained from the use of a two-position, multi-sectional mechanical switch as illustrated. This switch is formed by five double-break single-pole switch sections 1, 2, 3, 4 and 5. One contact 1ᵃ of the double-break single-pole switch element 1 is connected to the positive terminal of a high-tension supply, which supply is also connected to a spring blade 7 arranged to be cyclically actuated by a continuously rotating cam 8. The other contact 1ᵇ of switch element 1 is connected to a contact 9 associated with spring blade 7 and also to the anode of the receiving valve in the stage $b'$ by way of the tuned circuit $a'$. The contact 2ᵃ is connected to contact 10 associated with spring blade 7, and contact 2ᵇ is joined to the anode of the receiving valve in stage $b''$ by way of tuned circuit $a''$. Contact 3ᵃ of double-break single-pole switch element 3 is connected to contact 11ᵃ of another spring blade 11, which is arranged to be operated by a cam 8ᵃ mounted rigidly on the same spindle as cam 8, contact 11ᵇ coacting with contact 11ᵃ being joined by way of a hold-on coil 12 to one terminal of a suitable, e. g. 12-volts, D. C. supply E. The other contact 3ᵇ of switch element 3 is connected to the other terminal of the 12-volts supply E. Contact 4ᵃ of double-break single-pole switch element 4 is joined directly to contact 5ᵃ of double-break single-pole switch element 5 and is also connected to the first-mentioned terminal of the 12-volts supply E. Contact 5ᵇ of switch element 5 is connected to the driving mechanism associated with pulse-widening circuit $f''$ and contact 4ᵇ is connected to the driving mechanism associated with the pulse-widening circuit $f'$. A contact 13, associated with spring blade 7, is connected by way of an energizing coil 14 to the anode of the valve forming the D. C. amplifier $h$. Contact 4ᵇ and contact 5ᵇ are joined together by way of the series connection of two 12-volt lamps 15, 16, the point common to the lamps being joined to contact 3ᵇ and hence to the second-mentioned terminal of the 12-volts supply E.

Cam 8 is designed in such a manner that, during a complete period of its rotation, spring blade 7 makes contact with contact 10 for fourteen seconds and subsequently makes simultaneous contact with contacts 9 and 13 for two seconds. Cam 8ᵃ is arranged to engage with a blister on spring blade 11 one second before spring blade 7 makes contact with contacts 9 and 13, the period of engagement being about one-half of a second. The cams are arranged to be driven continuously in an anti-clockwise direction.

It is arranged that a negative bias potential is applied to the control grid of the valve in the D. C. amplifier $h$ of sufficient amount to prevent conduction. Its precise value is such that the D. C. potential across the diode rectifier $g$ which would be developed as a result of the rectification of signal pulses received from early-warning stations and which is dependent upon the repetition frequency of the exploring wave pulses, is not sufficient to overcome this negative bias potential, whereas that due to rectification of signal pulses received from gun-laying stations, which pulses have a higher repetition frequency, is sufficient to overcome this bias potential.

In operation, when coils 14 and 12 are de-energized, the change-over switch is biased, e. g. by spring means 17, to a first position such that double-break single-pole switch sections 1, 3 and 4 are open and the double-break single-pole switch sections 2 and 5 are closed as shown. Assuming cam 8 to be in such an angular position as to cause spring blade 7 to make contact with contact 10, the high-tension supply is connected to the anode of the receiving valve in stage $b''$ which is adapted to receive only signals transmitted from early-warning stations. Signals from these stations are received and the retransmitted signals are appropriately widened since a driving potential is applied to the driving mechanism associated with pulse-widening means $f''$ from the 12 volts supply E by way of double-break single-pole switch element 5.

One second before spring blade 7 makes contact with contacts 9 and 13, contact between $11^a$ and $11^b$ is broken by virtue of the engagement of cam $8^a$ with the blister on spring blade 11. No current is flowing through energizing winding 12 at this moment since double-break single-pole switch element 3 is open and hence the opening of contacts $11^a$ and $11^b$ has no effect upon the circuits. The opening of contacts $11^a$ and $11^b$ exists for about one-half of a second and after a further period of one-half of a second, spring blade 7 breaks contact with contact 10 and makes contact with contacts 9 and 13. The high-tension supply is now disconnected from the anode of receiving valve in stage $b''$ and is connected to the anode of receiving valve in stage $b'$ which is adapted to receive only signals transmitted from gun-laying stations. The high-tension supply is also applied to the anode of the valve in the D. C. amplifier $h$ by way of energizing coil 14.

If with the spring blade 7 in this position the aircraft is outside a gun-laying area, no signals are received or accepted by selector $a'$ from either gun-laying stations or early-warning stations. Further, the valve in the D. C. amplifier $h$ is not able to conduct because of the cutoff bias applied to its control grid. This period exists for two seconds, being terminated when cam 8 releases spring blade 7 to again make contact with contact 10 and break contact with contacts 9 and 13. The high-tension supply is now re-applied to the anode of the receiving valve in stage $b''$, and hence signals from early-warning stations are again received and accepted by selector $a''$ for a period of fourteen seconds. After this fourteen-second period the high-tension supply is disconnected from receiving valve $a''$ and again connected to the receiving valve in stage $b'$. Thus, this first-described position of the change-over switch is one which permits the several responders to operate singly in a predetermined cyclic order. So long as the aircraft is outside a gun-laying area, it receives signal pulses from early-warning stations for fourteen seconds and then for two seconds it receives or accepts nothing.

If, however, the aircraft enters a gun-laying area during the period when the signals transmitted from early-warning stations are being received, the connection of the high-tension supply to the anode of the receiving valve in stage $b'$ at the end of a fourteen-second period allows signals transmitted from a gun-laying station to be received. Also, the valve in the D. C. amplifier $h$ now conducts because the high-tension supply is connected to it and because the repetition frequency of the pulses transmitted from a gun-laying station and translated by superregenerator $b'$ is such as to cause the build-up of a potential across the diode rectifier $g$ of sufficient amount to overcome the cutoff bias applied to the control grid of the valve on thermionic amplifier $h$.

Conduction of this valve causes energizing coil 14 to actuate and move the change-over switch to its second position in which the double-break single-pole switch elements 1, 3 and 4 are closed and switch elements 2 and 5 are opened. Closure of switch element 3 permits the 12-volts supply E to be applied to the hold-on coil 12 by way of spring blade 11 (the contacts $11^a$ and $11^b$ of which are now closed). This coil aids coil 14 in maintaining switches 1, 3 and 4 closed.

This operation is more or less instantaneous and exists for a period of two seconds. At the end of this period spring blade 7 makes contact with contact 10 and breaks contact with contacts 9 and 13. Coil 14 is no longer energized because the high-tension supply is disconnected from the D. C. amplifier $h$, but, since switch 3 is closed and coil 12 is energized, the double-break single-pole switches 1, 3 and 4 remain closed. Signals from a gun-laying station continue to be received for a further period of thirteen seconds.

At this instant contacts $11^a$ and $11^b$ are broken, coil 12 is no longer energized since the 12-volts supply E is no longer applied to it and thus the change-over switch is returned from its second position back to its first position in which double-break single-pole switch elements 1, 3 and 4 are opened and double-break single-pole switch elements 2 and 5 are closed as shown in Fig. 3. Signals may now be received from early-warning stations. After one-half of a second spring blade 7 again makes contact with contacts 9 and 13 to initiate the normal two-second operation of the responder means $x$ which is responsive to gun-laying stations. If during this period the aircraft is still in a gun-laying area, signals are received by the valve in stage $b'$, the change-over switch is restored to its second position in the manner already described, and reception of signals from the gun-laying station is sustained for a further thirteen-second period as before.

If, however, the aircraft has left a gun-laying area, no signals are accepted during the period when spring switch 7 is in contact with contacts 9 and 13, and when, at the end of this period, these contacts are broken, the apparatus reverts to the first-mentioned operating condition for receiving signals from early-warning stations.

If the aircraft enters a gun-laying area while the change-over switch is in its second position and connecting the positive terminal of the high-tension supply to the anode of the receiving valve in stage $b'$, signals from the gun-laying station are immediately received, and continue to be received until contacts $11^a$ and $11^b$ are subsequently broken, the mode of operation being exactly as described above.

It will thus be seen that while the aircraft is outside the area of a gun-laying station, the change-over switch is in its first operating position, permitting each of the thermionic valve systems comprising the responder means $x$ and $y$ to operate singly in turn for the periods of two and fourteen seconds respectively assigned thereto by the cyclically operating switching means consisting of the cam-controlled switch blade 7 and contacts 9 and 10. With the change-over switch in this position, cam 8 and contacts 7 and 13 constitute automatic means for conditioning the change-over switch at regular intervals for movement from its first to its other operating position. The "regular intervals" referred to correspond to the operating periods cyclically assigned to responder $x$ by cam 8 and contacts 7 and 9.

When however, the aircraft enters the area of a gun-laying station and it is accordingly desired that substantially uninterrupted operation of the specific system $x$ responsive to such station should take place, the reception by the responder means $x$ of gun-laying station signals during its two-second cyclic operative period is characterized by the conduction of the D. C. amplifier $h$. Coil 14 comprises electromagnetic actuating means, actuated by occurrence during that two-second period of a signal output from responder $x$ which is present only when substantially uninterrupted operation of that responder is desired, for moving the change-over switch. This effects movement of the change-over switch to its opposite or second operating position and its being held in this position by means of coil 12 until released by opening of contacts 11, 11$^a$ just before the system $x$ is again due to be put into operation for its cyclic two-second period by the cyclically operated switch blade 7. If the aircraft is still within a gun-laying station area a repetition of events takes place whereby the system $x$ is operated continuously except for a short interruption at the end of each cycle of the arrangement.

An indication as to whether an aircraft is in a gun-laying area or not is given to the pilot by means of lamps 15 and 16 which may be differently colored. When in a gun-laying area double-break single-pole switch element 4 is closed and the 12-volts supply E is applied to lamp 15. When outside a gun-laying area, switch element 4 is open and switch element 5 is closed, thereby connecting the 12-volts supply E to lamp 16.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; automatic switching means for conditioning said change-over switching means at regular intervals for actuation from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching condition; means, having an energizing circuit which is completed upon said last-mentioned change for retaining said change-over switching means in said other condition; and means for momentarily interrupting said energizing circuit after a preselected time interval.

2. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; means for operating said systems in said predetermined cyclic order during operating intervals when said change-over switching means is in said switching condition; automatic switching means for conditioning said change-over switching means at regular intervals for actuation from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching condition; means having an energizing circuit which is completed upon said last-mentioned change for retaining said change-over switching means in said other switching condition; and means for momentarily interrupting said energizing circuit after a preselected time interval.

3. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; means, including switch contacts selectively operated by a continuously rotating cam mechanism, for operating said systems in said predetermined cyclic order during operating intervals when said change-over switching means is in said one switching condition; automatic switching means for conditioning said change-over switching means at regular intervals for actuation from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching condition; means having an energizing circuit which is completed upon said last-mentioned change for retaining said change-over switching means in said other switching condition; and means for momentarily interrupting said energizing circuit after a preselected time interval.

4. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits biased to one switching condition and so arranged as to effect in said one switching condition such intercoupling of said control circuits that said systems operate singly in said predetermined cyclic order and as to effect in another switching condition such intercoupling of said control circuits that a specific one of said systems operates in a substantially uninterrupted manner; automatic switching means for establishing at regular intervals a condition favorable to the change of said change-over switching means from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching conditions; electromagnetic means, having an energizing circuit which is completed upon the change of said change-over switching means from said one to said other switching condition, for retaining said switching means in said other switching condition; and means for momentarily interrupting said energizing circuit after a preselected time interval.

5. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits biased to one switching condition and so arranged as to effect in said one switching condition such intercoupling of said control circuits that said systems operate singly in said predetermined cyclic order and as to effect in another switching condition such intercoupling of said control circuits that a specific one of said systems operates in a substantially uninterrupted manner; automatic switching means for establishing at regular intervals a condition favorable to the change of said change-over switching means from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching condition; electromagnetic means, having an energizing circuit which includes normally closed contacts and which is completed upon the change of said change-over switching means from said one to said other switching condition, for retaining said change-over switching means in said other switching condition; and means for momentarily opening said contacts to interrupt said energizing circuit after a preselected time interval.

6. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; automatic switching means for establishing at regular intervals a condition favorable to the change of said change-over switching means from said one to said other switching condition; means, actuated by the occurrence during one of said regular intervals of a control signal derived in response to reception of a wave signal by said specific system only when the substantially uninterrupted operation of said specific system is desired, for effecting the change of said change-over switching means from said one to said other switching condition; means having an energizing circuit which is completed upon said last-mentioned change for retaining said change-over switching means in said other switching condition; and means for momentarily interrupting said energizing circuit after a preselected time interval.

7. A control arrangement for a plurality of thermionic valve systems having control circuits so arranged as to control said systems to operate singly in a predetermined cyclic order or to control a specific one of said systems to operate in a substantially uninterrupted manner comprising: change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; automatic switching means for establishing at regular intervals a condition favorable to the change of said change-over switching means from said one to said other switching condition; means, actuated by the occurrence during one of said regular intervals of a characteristic of a signal of said specific system which is present only when the substantially uninterrupted operation of said specific system is desired, for effecting the change of said change-over switching means from said one to said other switching condition; an indicating device controlled by said change-over switching means for indicating the switching condition thereof; means having an energizing circuit which is completed upon said last-mentioned change for retaining said change-over switching means in said other switching condition; and means for momentarily interrupting said energizing circuit after a preselected time interval.

8. A control arrangement for a plurality of thermionic valve systems having control circuits so arranged as to control said systems to operate singly in a predetermined cyclic order or to control a specific one of said systems to operate in a substantially uninterrupted manner comprising: cyclically operating means for assigning predetermined operating periods to each of said systems in turn in a preselected order; change-over switching means including switch elements coupled to said control circuits and so arranged as to effect in one switching condition such intercoupling of said control circuits that said systems operate singly in said predetermined cyclic order and as to effect in another switching condition such intercoupling of said control circuits that a specific one of said systems operates in a substantially uninterrupted manner; means, actuated by the occurrence during the assigned operating period of said specific system of a characteristic of a signal of said specific system which is present only when the substantially uninterrupted operation of that system is desired, for effecting the change of said change-over switching means for said one to said other switching condition; and means for returning said change-over switching means to said one switching condition immediately preceding a subsequent assigned operating period of said specific system.

MAURICE K. TAYLOR.
FREDERIC C. WILLIAMS.
RONALD H. A. CARTER.

REFERENCES CITED

The following references are of record in the file of this patent:

UNITED STATES PATENTS

| Number | Name | Date |
|---|---|---|
| 1,772,165 | Talor et al. | Aug. 5, 1930 |
| 1,842,222 | Wagner | Jan. 19, 1932 |
| 2,129,740 | Lewis | Sept. 13, 1938 |
| 2,159,647 | Alford | May 23, 1939 |
| 2,375,421 | Lear | May 8, 1945 |
| 2,415,667 | Wheeler | Feb. 11, 1947 |
| 2,421,106 | Wight | May 27, 1947 |
| 2,449,304 | Lamb | Sept. 14, 1948 |